United States Patent [19]

Hall

[11] Patent Number: 5,743,935
[45] Date of Patent: Apr. 28, 1998

[54] CONDITIONING COMPOSITION

[75] Inventor: David Alan Hall, Queensland, Australia

[73] Assignee: Plantagenet Holdings Pty Ltd., Australia

[21] Appl. No.: 615,695

[22] Filed: Mar. 13, 1996

Related U.S. Application Data

[63] Continuation-in-part of Ser. No. 388,464, Feb. 14, 1995, Pat. No. 5,605,557.

[51] Int. Cl.$^6$ .................................................. C05D 1/00
[52] U.S. Cl. ................................................ 71/62; 71/903
[58] Field of Search .................................... 71/62, 903

[56] References Cited

U.S. PATENT DOCUMENTS

| | | | |
|---|---|---|---|
| 1,111,490 | 9/1914 | Perino | 71/62 |
| 3,785,798 | 1/1974 | Horai et al. | 71/79 |
| 3,892,553 | 7/1975 | Goordman et al. | 71/13 |
| 3,966,641 | 6/1976 | Csatar et al. | 252/449 |
| 3,992,184 | 11/1976 | Baldock | 71/62 |
| 4,589,906 | 5/1986 | Brunn et al. | 71/80 |
| 5,085,681 | 2/1992 | Boukidis | 71/29 |
| 5,328,497 | 7/1994 | Hazlett | 71/28 |

FOREIGN PATENT DOCUMENTS

21561/88  3/1989  Austria ................ C05D 011/00

OTHER PUBLICATIONS

Hackh's Chemical Dictionary 1969.

*Primary Examiner*—Deborah Jones
*Attorney, Agent, or Firm*—Schwegman, Lundberg, Woessner & Kluth, P.A.

[57] ABSTRACT

A conditioning composition comprising from 60 to 80% by weight of a diamagnetic mineral source, from 20 to 40% by weight of a paramagnetic basalt, from 2 to 5% by weight of a bonding agent, and from 1 to 20% by weight of a mixed colloidal mineral source.

38 Claims, No Drawings

CONDITIONING COMPOSITION

This application is a continuation-in-part of U.S. patent application Ser No. 08/388,464, filed on Feb. 14, 1995, now issued as U.S. Pat. No. 5,605,557, and entitled "Conditioning Composition and Catalyst For Use Therewith" now U.S. Pat. No. 5,605,557.

The present invention relates to an improved conditioning composition and a method for producing that composition. In particular, the invention relates to a composition which is suitable for use as a soil conditioner or fertilizer.

Through years of farming, erosion, overgrazing and leaching, many of the earth's soils are becoming depleted in minerals. Additionally, the constant assault on soils by agricultural and horticulture chemicals is tending to cause imbalances of the required nutrients in those soils. Thus, the soils are often rendered unsuitable for further farming and are sometimes simply incapable of supporting normal levels of plant life.

An aim of the present invention is to provide an improved composition which is able to act as a soil conditioner or fertilizer and which provides an active source of energy and minerals, together with a method for producing such a composition.

The present invention provides a conditioning composition comprising a diamagnetic mineral source, a paramagnetic mineral source, a bonding agent, and a colloidal mineral source. The diamagnetic mineral source may be a diamagnetic granite-like mineral source and the paramagnetic mineral source may be a paramagnetic basalt-like mineral source. The present invention additionally provides a conditioning composition comprising from 60% to 80% by weight of a diamagnetic mineral source, from 20% to 40% by weight of a paramagnetic mineral source, from 2% to 5% by weight of a bonding agent, and from 1 to 20% by weight of a mixed colloidal mineral source.

Indeed, the composition of the invention of this patent application is a modification to the composition of U.S. Pat. No. 5,605,557. In this respect, the composition of the present invention has been found to function without a catalyst as a component thereof, a catalyst being a component of the composition described in U.S. Pat. No. 5,605,557.

The diamagnetic mineral source of the composition of the present invention is preferably a diamagnetic granite-like mineral source; namely, stone or rock of the granite-like family, such as glacial river gravel, feldspar, diorite, granite, and the like, and which is capable of acting as a source of minerals, trace minerals or ultra-trace minerals, provided that they are substantially free of heavy metal elements such as cadmium, mercury, lead, arsenic, uranium and the like.

The diamagnetic mineral source will preferably be diamagnetically susceptible, being of negative susceptibility such that magnetisation opposes a magnetic force, and having a permeability slightly less than unity. In this respect, it should be noted that the basalt is preferably paramagnetically susceptible, being of positive susceptibility. However, it should also be noted that some materials, and in particular some granites, may exhibit a paramagnetic susceptibility more akin to basalt (for instance). If such a granite is used in the composition of the present invention, then the basalt used should be of diamagnetic susceptibility. Conversely, if a particular basalt is found to be of diamagnetic susceptibility (which is uncommon), it would be preferred to use a mineral source of paramagnetic susceptibility. Therefore, the broad requirement of the present invention is for the composition to include both a diamagnetic mineral source and a paramagnetic mineral source, irrespective of which type of mineral provides which type of magnetic susceptibility.

Thus, the present invention also provides a conditioning composition comprising (in combination) a diamagnetic granite-like mineral source, a paramagnetic basalt-like mineral source, a bonding agent, and a mixed colloidal mineral source. Further, the present invention provides a conditioning composition comprising a diamagnetic granite, a paramagnetic basalt, a bonding agent, and a mixed colloidal mineral source. Further still, the present invention provides a conditioning composition comprising from 60% to 80% by weight of a diamagnetic granite-like mineral source, from 20% to 40% by weight of a paramagnetic basalt-like mineral source, from 2% to 5% by weight of a bonding agent, and from 1% to 20% by weight of a mixed colloidal mineral source.

Preferably, the mineral source of the composition of the invention is granite, and the composition preferably includes an amount of mixed colloidal granite to provide a level of mixed colloidal granite in the composition of from 1% to 10% by weight. However, it must be appreciated that reference to a mixed colloidal mineral source (and in the preferred form, a mixed colloidal granite) as a separate component to the mineral source (again, in the preferred form, a granite) is not to be taken as requiring the separate addition of components. Indeed, in the crushing and milling of a suitable amount of the mineral source there will always be generated an amount of colloidal residue and dust. This colloidal residue and dust is of course not normally captured with the crushed mineral source. However, in the present invention, the colloidal residue and dust may be advantageously captured, concentrated (if necessary), and combined to provide the required levels of colloidal mineral source. Thus, the requirements for a mineral source and a mixed colloidal mineral source may be met by the addition of an apparently single component.

Thus, in a preferred form of the invention, the composition contains about 70% by weight of a crushed and milled granite, about 25% by weight of a crushed and milled basalt, about 3% by weight of a bonding agent, and about 2% by weight of a mixed colloidal granite.

As indicated above, the mineral source is preferably a granite and is provided in a ratio of one-to-one as a combination of light granite and blue-green granite such as is quarried at Gosnells in Western Australia, Australia. The granite used is preferably low in silica, containing no more than 50% silica by weight, and preferably has an overall composition that includes the following (all percentages given by weight):

| | | | |
|---|---|---|---|
| $Al_2O_3$ | 12% | Co | 40 ppm |
| Ca | 4.75% | Cr | 79 ppm |
| Fe | 6% | Ni | 70 ppm |
| K | 3.5% | Zn | 100 ppm |
| Mg | 2.5% | Mn | 100 ppm |
| Na | 2.5% | P | 2250 ppm |
| Si | 50% | Mo | 5 ppm |
| Cu | 300 ppm | S | 40 ppm |

In this respect, when mixed in the final product, the level of alumina ($Al_2O_3$) in the final product preferably does not exceed about 7.5%, while the levels of calcium and iron are preferably such that their levels in the final product are at about 8% and 6% respectively. Further, the levels of potassium and magnesium preferably are such that their levels in the final product have a minimum of 2.5% and a maximum of 2.2% respectively, while the 2.5% sodium is a preferred maximum in the final product. The preferred levels of copper, cobalt chromium, nickel, zinc, manganese, phosphorus, molybdenum and sulphur should be enough so as, when combined, the correct elements are provided in the appropriate preferred proportions in the final product. Those preferred proportions are provided below.

Preferably, the basalt-like mineral source is simply basalt, basalt being a fine-grained igneous rock, the basalt including the following components, and being provided as basalt such as is quarried near Bunbury, Western Australia, Australia or Werribee, Victoria, Australia (or the like), all percentages given by weight:

| | | | |
|---|---|---|---|
| $Fe_2O_3$ | 10% | Cr | 120 ppm |
| CaO | 9% | S | 100 ppm |
| $Al_2O_3$ | 5% | Ni | 80 ppm |
| MgO | 5% | Cu | 55 ppm |
| $Na_2O$ | 2.5% | Co | 40 ppm |
| P | 0.5% | Mn | 15 ppm |
| $K_2O$ | 0.45% | | |

The presence of the bonding agent assists in binding the silica particles to prevent their interaction with fluorine in soils. In this respect fluorine occurs naturally in many soils and has also been injected into soils by the reasonably widespread use of superphosphate fertilisers. Due to the presence of the fluorine in soils treated by the improved composition of this invention, the microbial activity of the composition (in part due to the pseudomonus microbes already in the soil) would be inhibited by the interaction of the unbonded silica with the fluorine. However, by bonding the silica the interaction of the silica with fluorine is made negligible and thus the microbial activity is not damaged.

The bonding agent may be provided as standard grey cement. However, in a preferred form of the invention, the bonding agent is ground limestone provided in the form of talcum powder which is preferably low in magnesium (having, for example, levels as low as 0.50%). The limestone is preferably around to a size range of about 0.075 micron.

Where the mineral source )or the composition is granite, the mixed colloidal granite included in the composition is preferably provided from the same source as that granite as briefly indicated above. In this respect, fine granite dust produced during mining and extraction of the granite from a quarry is collected and is provided as the mixed colloidal granite in the final product. The colloidal granite assists in the production of humus in the soil. Humus is colloidal and to be complete as high quality plant food humus requires a broad spectrum of essential colloidal minerals. These are particles that are immediately available in the product and which are water soluble. These particles are preferably in a polarised state to assist in preventing them from being leached away.

While it is not essential for the composition of the invention to include a catalyst, and indeed it has been found that the composition will function without the catalyst, a catalyst may still be added if desired. In this respect, the catalyst described in U.S. Pat. No. 5,605,557 now U.S. Pat No. 5,605,557 may be utilised in amounts similar to those mentioned therein. For this purpose, the contents of now U.S. Pat. No. 5,605,557 are incorporated herein by reference.

Alternatively, the catalyst of U.S. Pat. No. 5,605,557 may be modified and may be provided in the composition of the present invention in an essentially organic form, thus providing an essentially organic product.

Preferably, the composition of the invention provides a wide range of natural minerals which, as indicated above, may be obtained from a wide variety of stone or rock such as glacial gravel, basalt, feldspar, granite or the like, while meeting the various proportions as indicated below (all percentages given by weight). The figures in brackets are the preferred values:

| | | | | |
|---|---|---|---|---|
| Carbon | 0.1 | to | 2.0% | (1.0%) |
| Silicon dioxide | 10.0 | to | 50.0% | (29.6%) |
| Aluminium oxide | 1.0 | to | 16.0% | (7.5%) |
| Iron | 2.0 | to | 8.0% | (5.0%) |
| Magnesium | 1.0 | to | 2.5% | (2.0%) |
| Sulphur | 0.0 | to | 2.0% | (1.0%) |
| Potassium | 1.0 | to | 4.5% | (2.5%) |
| Sodium | 0 | to | 3.0% | (1.2%) |
| Phosphorus | 0.05 | to | 5.0% | (1.0%) |
| Calcium | 2.0 | to | 8.0% | (6.0%) |
| Copper | 30 ppm | to | 400 ppm | (200 ppm) |
| Manganese | 50 ppm | to | 1000 ppm | (400 ppm) |
| Zinc | 40 ppm | to | 200 ppm | (150 ppm) |
| Chlorine | 0 | to | 40 ppm | (10 ppm) |
| Nickel | 0 | to | 30 ppm | (15 ppm) |
| Boron | 5 ppm | to | 100 ppm | (10 ppm) |
| Gallium | 5 ppm | to | 20 ppm | (15 ppm) |
| Molydenum | 5 ppm | to | 50 ppm | (10 ppm) |
| Chromium | 5 ppm | to | 50 ppm | (15 ppm) |
| Cobalt | 5 ppm | to | 20 ppm | (17 ppm) |
| Iodine | 1 ppm | to | 10 ppm | (5 ppm) |
| Selenium | 1 ppm | to | 25 ppm | (15 ppm) |
| Tin | 0 | to | 5 ppm | (1.0 ppm) |
| Antimony | 0 | to | 5 ppm | (0.8 ppm) |
| Tungsten | 1 ppm | to | 2 ppm | (1.0 ppm) |
| Silver | 0 | to | 1 ppm | (0.36 ppm) |
| Bismuth | 0 | to | 1 ppm | (0.1 ppm) |
| Germanium | 5 ppm | to | 200 ppm | (20 ppm) |
| Hydrogen | 0 | to | 100 ppm | (–) |
| Nitrogen | 0.005 ppm | to | 5.0% | (–) |

Additionally, further additives may be included in the composition of the invention as necessary. In particular, it is envisaged that some uses of the composition of the invention would benefit by the addition of sufficient levels of phosphate to cater for phosphate maintenance where, for example, leaching in catchment areas is a problem. Ideally, this would be beneficial for broad acre agriculture where good phosphate levels are apparent and maintenance is required due to soil pH being lower (ie acidity is high). In this respect, use of the composition in areas where the potential for leaching presents problems is beneficial because the paramagnetic attraction within the composition prevents the release of phosphorus into waterways while it and the remaining nutrients remain readily available. Furthermore, the addition of phosphates (such as phosphoric acid) assists in reducing the bonding effect which holds the nutrients, thus assisting in the release of the nutrients at an acceptable speed.

Thus, phosphoric acid may be added to the composition at an appropriate stage, either as a replacement for added wader, or in conjunction with added water where dilution of the phosphoric acid is required to control the levels of phosphate present. Preferably, the phosphoric acid is technical grade phosphoric acid, although food grade phosphoric acid may also be used. Of course, the phosphoric acid should be substantially free of heavy metals Alternatively, a rock phosphate or a soft rock phosphate such as that mined in North Carolina, USA may be added to provide the phosphates. Such a rock may be added to the original milled materials in levels of from 5 to 50% (by weight), although levels in the order of 10 to 20% (by weight) are preferred. In this respect, the rock may replace a part of the granite component in the composition, unless there are high levels of basalt. In that event, the reduction would be equally divided between the two.

Further still, where nitrogen and potassium may be required in the composition, such as for use in specialised agriculture such as potato farms, market gardens, or small crops in general that may be susceptible to leaching and pollution of the underground water and waterways, it is beneficial to also add potassium nitrate to the composition. Such potassium nitrate is preferably added in prilled form (K 38.67%, N 13.67%) to assist in enabling the product to remain stable for long periods.

Further still, where the magnetic susceptibility of the granite and/or basalt used is comparatively low, even though the required elements are available and thus the granite and/or basalt supplies are otherwise suitable, an iron slag component may be beneficially added to the composition. Furthermore, an iron slag component is also beneficial where it is more economical to grade the fines with vibratory screens, rather than the rotary screens that will be mentioned below, as the iron slag will assist in holding the zeta potential due to the paramagnetic attraction, thus helping to polarise the finished product as it passes through the final stage of production.

Preferably, an amount of iron slag is provided in the range of 5% to 15% (by weight), although the preferred amount is about 10% (by weight), where, in the total composition, granite and basalt are displaced equally. In this respect, the amount of iron slag required will generally alter in accordance with the requirements for extra magnetic potential. However, care will need to be taken in order to prevent causing an imbalance of the composition due to the addition of too much iron slag (ie. too much iron and calcium).

An example of an exemplary analysis of an iron slag that would prove useful is as follows:

| Fe | 1 to 10% | $P_2O_5$ | 0.01 to 0.25% |
|---|---|---|---|
| $SiO_2$ | 30 to 40% | Cu | 6 to 10 ppm |
| CaO | 30 to 40% | Co | 1 to 10 ppm |
| MgO | 1.0 to 2.0% | Cr | 16 to 25 ppm |
| $Na_2O$ | 0.25 to 0.5% | Mn | 0.5 to 0.9% |
| $K_2O$ | 0.5 to 1.5% | Zn | 10 to 20 ppm |
| MnO | 0.5 to 1.0% | Cd | 0 ppm |
| $SO_3$ | 1.0 to 2.0% | | |

Such a composition will beneficially provide a valuable level of calcium and available iron as soil nutrients or plants, while the other elements are not sufficiently high enough to create an imbalance in the composition.

In a further preferred form of the invention, the conditioning composition is processed such that the range of particle sizes of the composition is in compliance with the following mesh requirements (within ±20%):

| Mesh | Passing |
|---|---|
| 2.36 | 95–100% |
| 1.18 | 85 . 95% |
| 0.600 | 65–75% |
| 0.300 | 45–55% |
| 0.150 | 30–45% |
| 0.075 | 20–30% |

These mesh requirements are designed to ensure that there are a number of release time intervals to allow nutrients to be made available progressively without overdosing the soil. Thus, the smaller particles release nutrients earlier whereas the larger particles continue to release nutrients after further time periods. Furthermore, the mesh requirements also ensure that the larger particles are large enough to hold their zeta potential to activate a paramagnetic blanket for the soil. This phenomenon encourages the root system of plants to spread more evenly instead of the tendency towards north and south, due to the effect of the poles. Indeed, if strong paramagnetic rock makes up at least 40% of the product, gravity or shaker screens may be used in place of the rotary screen (referred to below) without the paramagnetic quality being disturbed.

The present invention also provides a method for producing an improved conditioning composition, the method comprising the steps of crushing a mineral source and basalt (the mineral source preferably being granite), classifying the crushed mixture of granite and basalt, preferably such that the crushed particles meet the mesh requirements referred to above, subsequently adding a bonding agent to the classified crushed particles, and agglomerating the subsequent mixture with water, wherein the crushing, classifying, and agglomeration occur in apparatus geared to turn in an anti-clockwise direction (when facing where the product enters the machine), preferably at revolutions per minute in the order of 15 to 30 revolutions. The mixing may be conducted in, for instance, a pug mill.

In a preferred form, the crushing means is a ball mill geared to turn in an anti-clockwise direction at about 20 revolutions per minute. However, the crushing means may be any suitable apparatus such as a Barmac crusher, or a Simmons rotary cone type crusher. A relatively slow speed is required in order to assist in reducing the creation of large impacts which would produce heat which may spoil the zeta potential of the molecules and of the colloidal particles.

Preferably, crushed granite and basalt are classified in a rotary screen of a size such that all material is smaller than 2.36 micron. Again, the rotary screen is preferably geared to turn in an anti-clockwise direction (when facing where the product enter the machine) in order to assist in the polarisation of the molecules. The speed of rotation of the rotary screen is preferably no more than 30 revolutions per minute and is more preferably about 20 revolutions per minute. In this respect, polarisation is most important for plant life, and the nearer the north pole the faster the plants mature. Indeed, plants will naturally send their major root systems in the direction of the poles, with the strongest tendency to the north pole. In relation to the present invention, due to the composition being polarised, a paramagnetic blanket is formed ensuring the east-west polarity is just as effective allowing much larger plant growth, with faster maturity, effectively allowing plants to reach their biological potential. The larger root growth ensures more organic matter under the soil, thus increasing soil fertility and providing more nutritious and disease resistant plants.

A mixing tank and feeding shute may be provided in order to allow the addition so the bonding agent to the crushed and classified mixture. Preferably, the bonding agent is added such that, in one form of the invention, an amount of limestone is added in the range of about 4 to 7%, or in another form of the invention, an amount of cement is added in the range of 1 to 3% by weight. As indicated above, the bonding agent is used to bond the silica to assist in the slow release of the nutrients and to prevent damage to the microbes of the molasses. In this respect, the inclusion of granite containing high levels of unbonded silica can produce toxic substances in the soil if the soil has previously been treated with superphosphate or if the soil has reasonably high levels of fluorine contaminants. As also indicated above, the bonding agent is preferably limestone if an organic form of the composition is required.

The agglomeration step is preferably used to mix and semi-granulate the final product. Again, the agglomerator preferably also turns in an anti-clockwise direction (when facing where the product enters the machine) to ensure the correct zeta potential and to ensure that polarisation of the product is maximised. This ensures that the cement mixes completely with the crushed and ground granite and basalt for total bonding of the particles and assists in the prevention of lumping in the finished product to prevent damage to agricultural machinery.

In the preferred form, a high pressure nozzle is utilised to apply water to the agglomerator in order to supply water in a fine spray at an angle to the axis of rotation of the agglomerator of about 30 degrees. Preferably, this water mixes with the material at a location about 1.5 meters from the entry of the product to the agglomerator. Furthermore, the water preferably strikes the mixing material on an upward motion, three-quarters of the distance of the upward arc. This assists in ensuring that the water mixes correctly and that semigranulation occurs. The water is preferably also polarised before being used in the mixing.

After having been stockpiled, the amount of product produced daily must be removed after the cement has cured, which is normally after about 12 hours. The amount of water used for the agglomeration step is somewhat dependent upon the moisture content of the raw materials. As the water content effects the bonding ability of the cement and also effects the flow of the material through the apparatus there is a need to monitor the moisture content thereof. In this respect, it has been found that volumes of water in the order of 25 liters per tonne to 50 liters per tonne may be required for use as makeup water in the agglomerator, depending upon the initial moisture levels.

In the further embodiment described above where phosphoric acid, a phosphate rock, and/or potassium nitrate are required to be added for specialised uses, the technical grade phosphoric acid is preferably added during the mixing in the agglomerator where water is added through the jet. The phosphoric acid may be substituted for the water or, alternatively, a dilution of the phosphoric acid and water may be added depending upon the required phosphate level in the finished product. Preferably, an amount of 30 to 100 kgs/tonne of acid would be added or more preferably an amount in the order of 40 to 50 kgs/tonne.

The phosphate rock may be added to the product at the entry stage of the agglomerator. The amount of phosphate rock added may be from 10 to 40% by weight, with a preferred value of about 15%, and may be added at the beginning of the mixing stage or to the conveyor carrying the product to the agglomerator.

The potassium nitrate may be added to the final product in a prilled, granulated form is an additional agglomerator, again turning in an anticlockwise direction. Preferably, this step is taken using final product that has matured to a point where the cement bonding of the silica is complete, which is often as long as five days. Thus, the addition of the potassium nitrate is preferably attended to after that time to minimise change to the bonding.

The amount of potassium nitrate added will be sufficient to satisfy the needs of the various types of agriculture that require the potassium and the nitrate, yet does not dilute the product enough to alter the beneficial structure. Preferably, an amount of potassium nitrate in the order of 40 to 100 kgs/tonne of product would be added, with a preferred amount often being about 50 kg/tonne. It has been found that levels less than about 40 kgs/tonne are generally insufficient to accomplish the required nutrient value while more than 100 kgs/tonne is generally cost prohibitive and alters the product balance by simple displacement.

Finally, it will be appreciated that there may be other variations and modifications to the methods and compositions described above that are also within the scope of the present invention.

We claim:

1. A conditioning composition comprising from 60 to 80% by weight of a diamagnetic mineral source, from 20 to 40% by weight of a paramagnetic basalt, from 2 to 5% by weight of a bonding agent, and from 1 to 20% by weight of a mixed colloidal mineral source.

2. A conditioning composition according to claim 1, wherein the mixed colloidal mineral source comprises a mixed colloidal granite in an amount from 1% to 10% by weight thereof in the composition.

3. A conditioning composition according to claim 1 wherein the diamagnetic mineral source is selected from the group comprising diorite, granite, feldspar, and glacial gravel.

4. A conditioning composition according to claim 3 comprising about 70% by weight granite, about 25% by weight basalt, about 3% by weight bonding agent, and about 2% by weight mixed colloidal granite.

5. A conditioning composition according to claim 3 wherein the granite is crushed and milled.

6. A conditioning composition according to claim 1 wherein the diamagnetic mineral source contains no more than 50% silica by weight.

7. A conditioning composition according to claim 1 wherein the diamagnetic mineral source is such that the composition contains levels of alumina, calcium, iron, potassium, magnesium and sodium such that their levels in the composition are as follows (percentage given by weight):

| | |
|---|---|
| alumina | no more than 7.5% |
| calcium | no more than 8.0% |
| iron | no more than 6.0% |
| potassium | no less than 2.5% |
| magnesium | no more than 2.2% |
| sodium | no more than 2.5%. |

8. A conditioning composition according to claim 1 wherein the basalt is crushed and milled.

9. A conditioning composition according to claim 1 wherein the bonding agent is limestone in the form of talcum powder of size range 0.075 micron or less.

10. A conditioning composition according to claim 3, wherein fine granite dust produced during mining and/or extraction of granite from a quarry is collected and is provided as the mixed colloidal granite.

11. A conditioning composition according to claim 10 wherein the mixed colloidal granite is provided from the same source as the diamagnetic mineral source.

12. A conditioning composition according to claim 10 wherein the mixed colloidal granite is a polarized, water soluble particulate material.

13. A conditioning composition according to claim 1 wherein the composition additionally includes phosphoric acid.

14. A conditioning composition according to claim 13 wherein the phosphoric acid is in the range of from 3 to 10% by weight.

15. A conditioning composition according to claim 1 wherein the composition additionally includes phosphate rock.

16. A conditioning composition according to claim 15 wherein the phosphate rock is in the range of from 3 to 5% by weight.

17. A conditioning composition according to claim 1 wherein the composition additionally includes potassium nitrate in prilled form.

18. A conditioning composition according to claim 17 wherein the potassium nitrate is in the range of from 4 10 10% by weight.

19. A conditioning composition according to claim 1 wherein the composition additionally includes an iron slag component.

20. A conditioning composition according to claim 19 wherein the iron slag is in the range of from 5 to 15% (by weight).

21. A conditioning composition according to claim 1 wherein the composition has a range of particle sizes in compliance with the following mesh requirements (within ±20%):

| Mesh | Passing |
|---|---|
| 2.36 | 95–100% |
| 1.18 | 85–95% |
| 0.600 | 65–75% |
| 0.300 | 45–55% |
| 0.150 | 30–45% |
| 0.075 | 20–30%. |

22. A method for producing a conditioning composition from 60 to 80% by weight of a diamagnetic mineral source, from 20 to 40% by weight of a paramagnetic basalt, from 2 to 5% by weight of a bonding agent, and from 1 to 20% by weight of a mixed colloidal mineral source, the method comprising the steps of: crushing a diamagnetic mineral source and a paramagnetic basalt; classifying the crushed mixture of mineral source and basalt; adding a bonding agent to the classified crushed particles; and agglomerating the mixture with water, wherein the crushing, classifying and agglomeration occur in apparatus geared to turn in an anti-clockwise direction.

23. A method according to claim 22 wherein the diamagnetic mineral source is granite.

24. A method according to claim 23 wherein the crushed mixture of granite and basalt are classified according to the following mesh requirements:

| Mesh | Passing |
|---|---|
| 2.36 | 95–100% |
| 1.18 | 85–95% |
| 0.600 | 65–75% |
| 0.300 | 45–55% |
| 0.150 | 30–45% |
| 0.075 | 20–30%. |

25. A method according to claim 22 wherein the crushing, classifying, and agglomeration occur in apparatus geared to turn in an anti-clockwise direction at revolutions per minute in the order of 15 to 30 revolutions.

26. A method according to claim 22, wherein water is added to the agglomeration step in the form of a fine spray at an angle to the axis of rotation of the agglomerator of about 30 degrees.

27. A method according to claim 26 wherein the water strikes the mixing material on an upward motion to achieve maximum mixing.

28. A conditioning composition comprising from 60 to 80% by weight of diamagnetic granite, from 20 to 40% by weight of paramagnetic basalt, from 2 to 5% by weight of a bonding agent, and from 1 to 10% by weight of mixed colloidal granite.

29. A conditioning composition according to claim 1 or claim 28 wherein the conditioning composition contains:

| | | | |
|---|---|---|---|
| Carbon | 0.1 | to | 2.0% |
| Silicon dioxide | 10.0 | to | 50.0% |
| Aluminum oxide | 1.0 | to | 16.0% |
| Iron | 2.0 | to | 8.0% |
| Magnesium | 1.0 | to | 2.5% |
| Sulphur | 0.0 | to | 2.0% |
| Potassium | 1.0 | to | 4.5% |
| Sodium | 0 | to | 3.0% |
| Phosphoros | 0.05 | to | 5.0% |
| Calcium | 2.0 | to | 8.0% |
| Copper | 30 ppm | to | 400 ppm |
| Manganese | 50 ppm | to | 1000 ppm |
| Zinc | 40 ppm | to | 200 ppm |
| Chlorine | 0 | to | 40 ppm |
| Nickel | 0 | to | 30 ppm |
| Boron | 5 ppm | to | 100 ppm |
| Callium | 5 ppm | to | 20 ppm |
| Molydenum | 5 ppm | to | 50 ppm |
| Chromium | 5 ppm | to | 50 ppm |
| Cobalt | 5 ppm | to | 20 ppm |
| Iodine | 1 ppm | to | 10 ppm |
| Selenium | 1 ppm | to | 25 ppm |
| Tin | 0 | to | 5 ppm |
| Antimony | 0 | to | 5 ppm |
| Tungsten | 1 ppm | to | 2 ppm |
| Silver | 0 | to | 1 ppm |
| Bismuth | 0 | to | 1 ppm |
| Germanium | 5 ppm | to | 200 ppm |
| Hydrogen | 0 | to | 100 ppm |
| Nitrogen | 0.005 ppm | to | 5.0%. |

30. A conditioning composition comprising a diamagnetic granite-like mineral source, a paramagnetic basalt-like mineral source, a bonding agent, and a mixed colloidal mineral source.

31. A conditioning composition comprising a diamagnetic mineral source, a paramagnetic mineral source, a bonding agent, and a colloidal mineral source.

32. A conditioning composition according to claim 31 wherein the diamagnetic mineral source is a granite-like mineral source, the paramagnetic mineral source is a basalt-like mineral source, and the colloidal mineral source is a granite-like mineral source.

33. A conditioning composition according to claim 31 wherein the diamagnetic mineral source is a basalt-like mineral source, the paramagnetic mineral source is a granite-like mineral source, and the colloidal mineral source is a basalt-like mineral source.

34. A conditioning composition according to claim 31 wherein the diamagnetic and paramagnetic mineral sources are from the same source material, the source material having diamagnetic and paramagnetic portions.

35. A conditioning composition according to claim 31, the composition comprising from 60 to 80% by weight of the diamagnetic mineral source, from 20 to 40% by weight of the paramagnetic mineral source, from 2 to 5% by weight of the bonding agent, and from 1 to 20% by weight of the colloidal mineral source.

36. A conditioning composition according to claim 31, the composition including a catalyst to assist in releasing the nutrients from the mineral sources to the soil, and to assist in providing microbial activity.

37. A conditioning composition comprising a diamagnetic granite, a paramagnetic basalt, a bonding agent, and a mixed colloidal mineral source.

38. A conditioning composition comprising from 60% to 80% by weight of a diamagnetic granite-like mineral source, from 20% to 40% by weight of a paramagnetic basalt-like mineral source, from 2% to 5% by weight of a bonding agent, and from 1% to 20% by weight of a mixed colloidal mineral source.

\* \* \* \* \*